No. 628,952. Patented July 18, 1899.
P. W. MOREHEAD.
THILL COUPLING.
(Application filed Mar. 17, 1899.)
(No Model.)
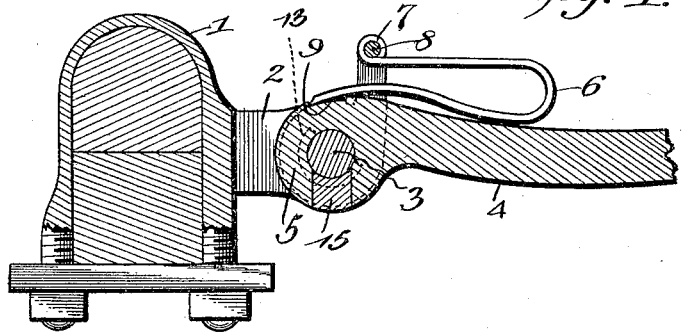
Fig. 1.
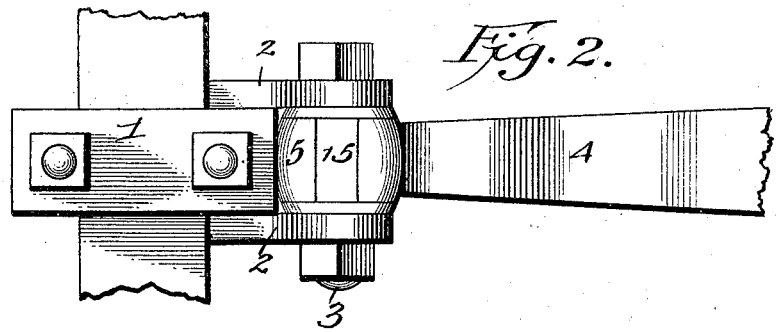
Fig. 2.
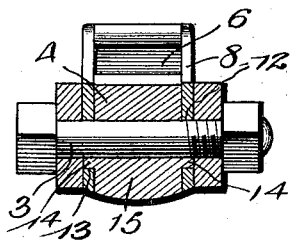
Fig. 3.
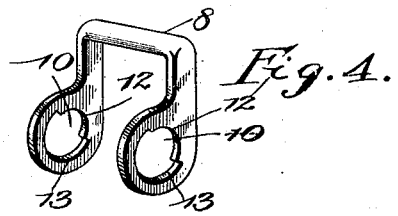
Fig. 4.
Fig. 5.
Fig. 6.
Witnesses
Presley W. Morehead, Inventor.
By his Attorneys
C. A. Snow & Co.

UNITED STATES PATENT OFFICE.

PRESLEY W. MOREHEAD, OF NEW MARKET, VIRGINIA.

THILL-COUPLING.

SPECIFICATION forming part of Letters Patent No. 628,952, dated July 18, 1899.

Application filed March 17, 1899. Serial No. 709,490. (No model.)

*To all whom it may concern:*

Be it known that I, PRESLEY W. MOREHEAD, a citizen of the United States, residing at New Market, in the county of Shenandoah and State of Virginia, have invented a new and useful Thill-Coupling, of which the following is a specification.

The invention relates to improvements in thill-couplings.

The object of the present invention is to improve the construction of thill-couplings, more especially that shown and described in Patent No. 612,863, granted to me October 25, 1898, and to relieve the transverse pivot of unequal wear.

Another object of the invention is to close the mouth of the open eye or hook of the thill or coupling iron, and thereby render the thill-coupling substantially dust-proof.

The invention consists in the construction and novel combination and arrangement of parts, hereinafter fully described, illustrated in the accompanying drawings, and pointed out in the claims hereto appended.

In the drawings, Figure 1 is a longitudinal sectional view of a thill-coupling constructed in accordance with this invention. Fig. 2 is a reverse plan view of the same. Fig. 3 is a transverse sectional view. Fig. 4 is a detail perspective view of the loop or shackle. Fig. 5 is a similar view of the bearing-plate. Fig. 6 is a detail view of a modified form of the same.

Like numerals of reference designate corresponding parts in all the figures of the drawings.

1 designates an axle-clip provided with forwardly-extending ears 2, receiving a transverse coupling-bolt 3, which forms a pivot for a thill or coupling iron 4. The thill or coupling iron is provided at its rear end with an open eye or hook 5, the opening being at the bottom and permitting the thrill-iron to be readily placed on and removed from the transverse pivot.

The thill-iron is retained on the coupling-bolt by a substantially U-shaped locking-spring 6, adapted to operate as an antirattler-spring and located at the top of the thill-iron. The upper side of the spring is provided with an eye 7, which receives the transverse portion of a loop or shackle 8, and the inner or lower side of the spring engages a recess 9 of the thill-iron. The loop 8 straddles the thill-iron, and its sides are interposed between the latter and the inner faces of the ears 2 and are provided with openings 10, forming eyes and receiving the transverse pivot. The upper portions 12 of the walls of the eyes or openings 10 conform to the configuration of the pivot and bear against the same, while the lower portions 13 of the walls of the said eyes 10 are enlarged to form intervening spaces between the bottom walls and the transverse pivot, as clearly indicated by dotted lines in Fig. 1 of the accompanying drawings. These curved openings or spaces receive the ends 14 of a bearing plate or piece 15, which is arranged within the openings or mouth of the hook or open eye of the thill-iron, as clearly illustrated in the accompanying drawings. This bearing piece or plate, which extends entirely across the space between the perforated ears, is held against the pivot by the spring, and while it is adapted to equalize the strain and wear on the pivot it also operates to close the mouth or opening of the hook and exclude dust and dirt from the bearing. The opening or mouth of the hook is preferably entirely filled by the bearing block or piece which, when constructed as illustrated in Fig. 5 of the accompanying drawings, has its ends recessed to form projecting portions to engage the openings of the loop or shackle; but a plain bearing-plate, such as is shown in Fig. 6, may be employed. The bearing-plate 16 is curved transversely and is of the same thickness throughout its entire length. When the parts are assembled as illustrated in Fig. 1, the thill-iron, the shackle or loop, and the bearing piece or plate all move together on the pivot, so that the wear on the latter is uniform.

The invention has the following advantages: The bearing plate or piece, which is simple and comparatively inexpensive in construction, is readily applied to the thill-coupling, and while it equalizes the wear on the pivot and provides a bearing entirely across the space between the perforated ears it closes the mouth of the hook and excludes dust and dirt from the bearing. The spring holds the bearing-plate tightly against the transverse pivot, and the curved openings or spaces formed by the enlargement of the eyes and receiving the ends of the bearing-plate permit the shackle or loop to move independently of the coupling or thill iron in swinging it backward to release the said iron. The bearing device does not interfere with the operation of the thill-coupling, and the spring may be readily swung into and out of engagement with the thill-iron.

Changes in the form, proportion, size, and the minor details of construction within the scope of the appended claims may be resorted to without departing from the spirit or sacrificing any of the advantages of this invention.

What is claimed is—

1. A device of the class described comprising an axle-clip having a transverse pivot, a thill-iron provided with an open eye or hook detachably arranged on the pivot, a loop straddling the thill-iron and provided with openings receiving the pivot, a bearing plate or piece arranged in the mouth of the eye or hook and having its ends fitting within the openings of the loop, whereby it is supported in position, and a spring engaging the loop and the thill-iron, substantially as described.

2. A device of the class described comprising an axle-clip having a transverse pivot, a thill or coupling iron having an open eye or hook detachably arranged on the pivot, a loop straddling the thill or coupling iron and having eyes receiving the pivot and enlarged at the bottom to provide openings or spaces, a bearing plate or piece fitting in the mouth of the open eye or hook of the thill-iron and having its ends arranged in the said openings or spaces of the loop, and means for connecting the loop with the thill or coupling iron, whereby the latter is retained on the pivot, substantially as described.

3. In a device of the class described, the combination with a transverse pivot, and a thill or coupling iron having an open eye or hook, of a loop straddling the thill or coupling iron and provided with eyes receiving the pivot and enlarged to form openings or spaces, a coupling plate or piece filling the mouth of the open eye or hook and having its ends recessed and arranged in the openings or spaces of the loop, and means for connecting the same with the thill or coupling iron, whereby the latter is retained on the pivot, substantially as described.

In testimony that I claim the foregoing as my own I have hereto affixed my signature in the presence of two witnesses.

PRESLEY W. MOREHEAD.

Witnesses:
GILBERT L. WALDEN,
AUSTIN A. WALDEN.